Figure 1:
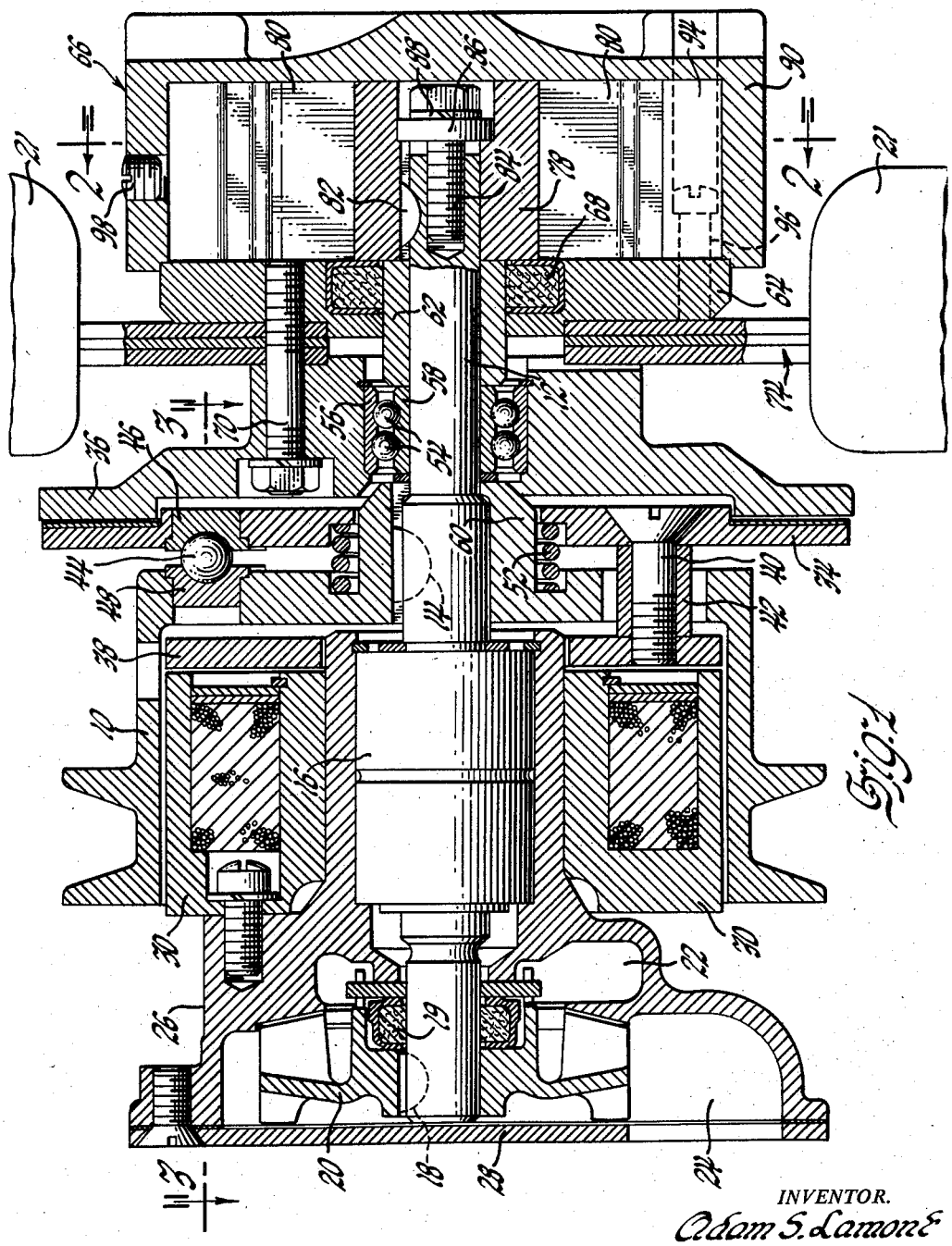

July 21, 1959 — A. S. LAMONT — 2,895,575
VARIABLE SPEED MECHANISM
Filed Nov. 29, 1957 — 2 Sheets-Sheet 1

INVENTOR.
Adam S. Lamont
BY Paul Fitzpatrick
ATTORNEY

July 21, 1959      A. S. LAMONT      2,895,575
VARIABLE SPEED MECHANISM

Filed Nov. 29, 1957      2 Sheets-Sheet 2

INVENTOR.
Adam S. Lamont
BY Paul Fitzpatrick
ATTORNEY

United States Patent Office 2,895,575
Patented July 21, 1959

2,895,575

VARIABLE SPEED MECHANISM

Adam S. Lamont, Pontiac, Mich., assignor to General Motors Corporation, Detroit, Mich., a corporation of Delaware Application November 29, 1957, Serial No. 699,738

8 Claims. (Cl. 192—3.2)

This invention relates to a variable speed mechanism and in its most specific aspect concerns a variable speed cooling fan and water pump assembly for self-propelled vehicles. Although particularly contemplated for installation on marine vehicles, especially amphibious vehicles, the mechanism has other applications. Thus, it may be employed with advantage in automobiles, including trucks and coaches.

In certain amphibious craft employing sea water for engine cooling, air cooling of the exhaust manifolds is still required when the vehicle is water borne. According to the invention the cooling fan, with the vehicle afloat, is caused to rotate at a much slower speed than when the vehicle is traveling over land, i.e., the cooling fan speed is so controlled as to answer only to the requirements of the exhaust manifold. Thus, a substantial saving in horsepower is achieved, or expressed differently, horsepower which would otherwise be expended in unnecessary high speed operation of the cooling fan is made available for propelling the vehicle.

In the instance of the vehicle just referred to, it is most practical to effect the shift to low speed fan operation through a conveniently located, manually actuable member as a switch or lever, for example. In automobiles on the other hand, where air cooling of the radiator, as well as the exhaust manifold, is considered necessary at all times, except perhaps in the case of racing vehicles on short "drag" courses, the shift from high speed operation of the fan to low speed operation thereof will logically be made a function of the coolant temperature, a suitable thermostat being provided for the purpose.

Figure 2:
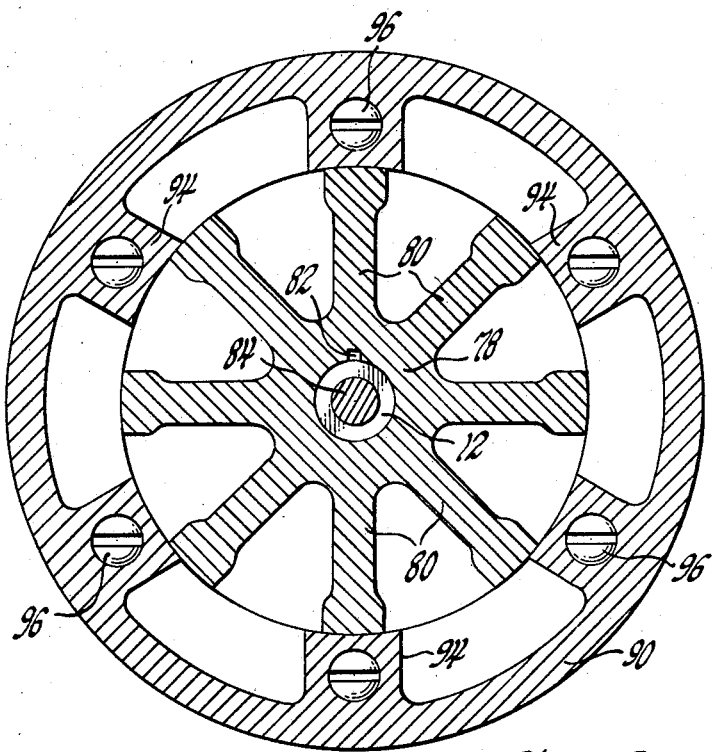
Figure 3:
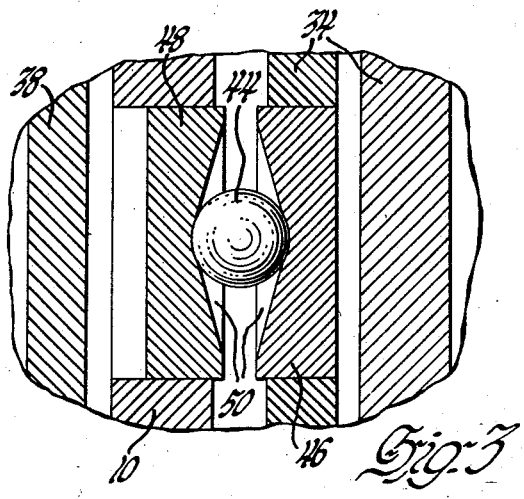

The principal objects of the invention being implicit in the foregoing, reference will now be made to the accompanying drawings illustrating a preferred embodiment thereof. In the drawings:

Figure 1 is a longitudinal section through the assembly;
Figure 2 is a section on the line 2—2 in Figure 1; and
Figure 3 is a fragmentary section on the line 3—3 in Figure 1.

Discussing first Figure 1, the numeral 10 denotes a pulley sheave normally powered by the engine of the vehicle. The sheave drives a shaft 12 to which it is shown operably connected via a key 14. Shaft 12 is journaled in a bearing assembly 16, which may be of any suitable type, and forward of the bearing is connected via a key 18 to an impeller 20 whereby the liquid coolant is circulated through the engine jacket not shown. Impeller 20 draws from a cavity 22 with which the return line from the engine connects and discharges via a port 24. A packing seal 19 prevents entry of coolant into the bearing housing.

The casing for the water pump is provided by a member 26 and a front cover plate 28. This fixed member 26 contains the bearing assembly 16 and supports a plurality of solenoids 30 which may be controlled manually through a switch, not shown, in a location convenient to the operator of the vehicle or, as has been suggested, the solenoid switch may be thermostatically controlled.

Solenoids 30 are functional with relation to a friction clutch plate 34 coactive with respect to a companion plate 36. An annular armature 38 will be seen disposed mediate the solenoids 30 and the clutch plates. The armature is shown connected to the plate 34 by flat-headed bolts 40 threaded into the armature to an extent determined by spacing sleeves 42.

With the solenoids de-energized, and with the clutch plates in engagement by force of a spring 52, as obtains under the condition when it is desirable to operate the fan blades 21 at the higher of the two speeds afforded, the clutch drive is through a plurality of balls 44 contained between members 46, 48 carried by plate 34 and sheave 10, respectively. Members 46 and 48 are of plug-like formation and may be press-fitted into the clutch plate and sheave as illustrated in Figure 3. As shown in the indicated figure, the members 46 and 48 have inner surfaces formed to provide a pocket for the ball 44. Thus, with the clutch plates disengaged the balls are retained between such members. With the clutch plates engaged, and assuming clockwise rotation of the drive shaft 12, ball 44 tends to move up the ramp constituted of surface 50.

Clutch plate 36 rotates on ball bearings 54 carried between annular races 56 and 58, surrounding the drive shaft 12, and contained between the boss portion 60 of sheave 10 and a spacer sleeve 62. The spacer sleeve 62 is surrounded by the inner casing component 64 of a fluid coupling 66. Such component 64 has a recess therein for a packing seal 68 and is secured by bolts 70 to the clutch plate 36 and the fan blade assembly 74.

Fluid coupling 66 comprises a paddle wheel (Figure 2) including a hub portion 78 and vanes 80. The paddle wheel is secured to the end of the drive shaft 12 via a key 82 and a bolt 84 threaded into the end of the drive shaft. The bolt carries a ring piece 86 shouldering against the hub 78 of the paddle wheel and a lock washer 88 precluding loosening of the bolt.

As shown in Figure 2, the housing or casing component 90 of the fluid coupling 66 is formed to provide inwardly extending vanes 94 which coact with vanes 80. Bolts 96 serve to secure the casing member 90 to the casing member 64. A threaded plug 98 (Figure 1) closes an opening through which the selected operating fluid is introduced into the coupling.

To review now the operation of the assembly in terms of the amphibious craft hereinbefore mentioned, let it be assumed that the vehicle has been traveling over land and is about to enter the water. Under the condition of land travel, as should already be clear, clutch plates 34 and 36 are in engagement by virtue of the spring 52 so that the water pump impeller 20 and the fan blades 21 are operated at the higher speed, with driving of the fan blades being accomplished positively through the balls 44 confined between the ramp-providing members 46 and 48.

Once the vehicle is afloat, the solenoids 30 are energized, with the result that clutch plate 34 is retracted by the annular armature 38 acting through bolts 40, and balls 44 become displaced to their central positions shown by Figure 3. As a consequence of the disengagement of the clutch plates, fan blades 21 can only be operated through the fluid coupling 66, i.e. by fluid drag. Under this condition the rate of rotation of the blades becomes a function of the quantity of fluid contained in the coupling 66 and such quantity is gauged to provide only the amount of cooling air required by the exhaust manifold. Any change in the fan speed which may be considered desirable requires only the addition of fluid to or the withdrawal of fluid from the coupling.

The invention being thus described and illustrated, what is claimed is:

1. In a vehicle equipped with a pair of accessory mechanisms one of which is desirably operated at first and second speeds reflecting conditions of relatively high and relatively low demand thereon, the combination of a drive for said accessory mechanisms comprising: a drive member directly connected to the other of said accessory mechanisms, a fluid coupling including an output member and an element directly connected to said drive member, said coupling being filled with a predetermined quantity of fluid, means interconnecting said output member and said one accessory mechanism, clutch means including a first component connected to said output member and a second component connected to said drive member, means normally urging said clutch components into engagement and means for effecting disengagement of such components, said drive being characterized in operation in that on disengagement of said clutch components movement of said output member is caused to continue by fluid impelled thereagainst by said input member and in that the rate of such movement is determined by said predetermined quantity of fluid, said rate being less than the rate of movement of said output member with the said clutch components engaged.

2. In a vehicle equipped with a pair of accessory mechanisms one of which is desirably operated at first and second speeds reflecting conditions of relatively high and relatively low demand thereon, the combination of a drive for said accessory mechanisms comprising: a drive shaft directly connected to the other of said accessory mechanisms, a fluid coupling including a component having radially inwardly extending vanes and a component having radially outwardly extending vanes, said coupling being filled with a predetermined quantity of fluid, one of said components being directly connected to said drive shaft, means interconnecting said one accessory mechanism and the other of said components, clutch means including a first element connected to the said other component and a second element connected to said drive shaft, means normally urging said clutch elements into engagement and means for effecting disengagement of such elements, said drive being characterized in operation in that on disengagement of said clutch elements movement of said other component is caused to continue by fluid impelled thereagainst by said one component and in that the rate of such movement is determined by said predetermined quantity of fluid, said rate being less than the rate of movement of said other component with the said clutch elements engaged.

3. In a vehicle equipped with a pair of accessory mechanisms one of which is desirably operated at first and second speeds reflecting conditions of relatively high and relatively low demand thereon, the combination of a drive for said accessory mechanisms comprising: a drive shaft directly connected to the other of said accessory mechanisms, a fluid coupling including a first component having radially inwardly extending vanes and a second component having radially outwardly extending vanes, said coupling being filled with a predetermined quantity of fluid, said first component being connected to said one accessory mechanism, said second component being directly connected to said drive shaft, clutch means including a first element connected to said first component and a second element connected to said drive shaft, yieldable means normally urging said clutch elements into engagement and means for effecting disengagement of such elements, said drive being characterized in operation in that on disengagement of said clutch elements movement of said first component is caused to continue by fluid impelled thereagainst by said second component and in that the rate of such movement is determined by said predetermined quantity of fluid, said rate being less than the rate of movement of said first component with said clutch elements engaged.

4. A drive according to claim 3 wherein said first component constitutes a portion of a casing in which the fluid for the said coupling is confined.

5. In a vehicle equipped with a pair of accessory mechanisms one of which is desirably operated at first and second speeds reflecting conditions of relatively high and relatively low demand thereon, the combination of a drive for said accessory mechanisms comprising: a pulley sheave, a drive shaft driven through said pulley, said shaft being directly connected to the other of said accessory mechanisms, a fluid coupling including an output member connected to said one accessory mechanism and a member driven by said drive shaft, said coupling being filled with a predetermined quantity of fluid, clutch means including a first component connected to said output member and a second component connected to said drive shaft through said sheave, such last connection comprising pocketed ball means located between said sheave and said second component and displaceable to an extent sufficient to allow for clutching and declutching movement of said second component, yieldable means normally urging said second component into engagement with said first component and solenoid means for effecting disengagement of said clutch components, said mechanism being characterized in operation in that on such disengagement movement of said output member is caused to continue by fluid impelled thereagainst by said input member and in that the rate of such movement is determined by said predetermined quantity of fluid, said rate being less than the rate of movement of said output member with the said clutch components engaged.

6. In a vehicle equipped with a cooling fan and an impeller type water pump, said fan being desirably operated at first and second speeds reflecting conditions of relatively high and relatively low demand thereon, a drive for said fan and pump comprising: a drive shaft directly connected to the pump impeller, a fluid coupling including a first component having radially inwardly extending vanes and a second component having radially outwardly extending vanes, said coupling being filled with a predetermined quantity of fluid, said first component being connected to said fan, clutch means including a first element connected to said first component and a second element connected to said drive shaft, means normally urging said clutch elements into engagement and means for effecting disengagement of said elements, said drive being characterized in operation in that on disengagement of said clutch elements movement of said first component and said fan is caused to continue by fluid impelled against said first component by said second component and in that the rate of such movement is determined by said predetermined quantity of fluid, said rate being less than the rate of movement of said first component and said fan with the said clutch elements engaged.

7. A drive according to claim 6 wherein said drive shaft is driven by a pulley sheave, said sheave being connected to said second element via pocketed ball means displaceable to an extent sufficient to allow for clutching and declutching movement of said second element and wherein the means for maintaining the normal condition of engagement between said elements takes the form of a spring located mediate said sheave and said second element.

8. A drive according to claim 7 in which the means for effecting disengagement of said elements is a solenoid device comprising an annular armature having connection with said second element.

References Cited in the file of this patent
UNITED STATES PATENTS

| | | |
|---|---|---|
| 2,616,537 | Grattan | Nov. 4, 1952 |
| 2,699,849 | Foster et al. | Jan. 18, 1955 |
| 2,736,407 | Smirl | Feb. 28, 1956 |